United States Patent [19]

Hveem

[11] 4,109,745
[45] Aug. 29, 1978

[54] MANUALLY OPERATED THROTTLE CONTROL FOR FOUR WHEEL DRIVE VEHICLE

[76] Inventor: Carl J. Hveem, 3221 N. 27th St., Phoenix, Ariz. 85016

[21] Appl. No.: 776,239

[22] Filed: Mar. 10, 1977

[51] Int. Cl.² .............................................. B60K 41/06
[52] U.S. Cl. ..................................... 180/77 H; 74/879
[58] Field of Search ............... 180/19 R, 19 H, 77 R, 180/77 H; 74/879, 489

[56] References Cited

U.S. PATENT DOCUMENTS

| | | | |
|---|---|---|---|
| 1,815,772 | 7/1931 | Gray | 74/879 |
| 1,959,881 | 5/1934 | Smelzer | 74/879 |
| 3,094,185 | 6/1963 | Racoosin | 180/19 R X |
| 3,515,313 | 6/1970 | Siems | 180/19 H X |
| 4,002,350 | 1/1977 | Timbs | 180/77 H X |

Primary Examiner—Kenneth H. Betts
Assistant Examiner—Michael Mar
Attorney, Agent, or Firm—H. Gordon Shields

[57] ABSTRACT

Hand operated throttle control apparatus includes a pivoting lever secured to a housing and connected to a cable which extends to the throttle of an engine. The lever, its housing, and the cable, are in turn secured to a gearshift lever conveniently for manual movement of the lever in conjunction with movement of the gearshift lever.

9 Claims, 4 Drawing Figures

U.S. Patent    Aug. 29, 1978    4,109,745
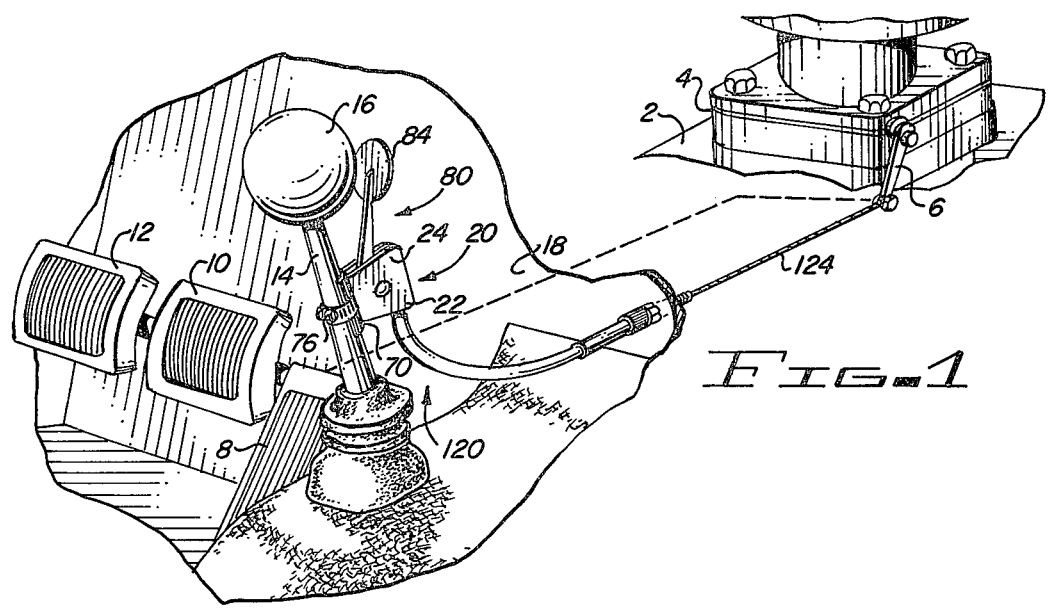
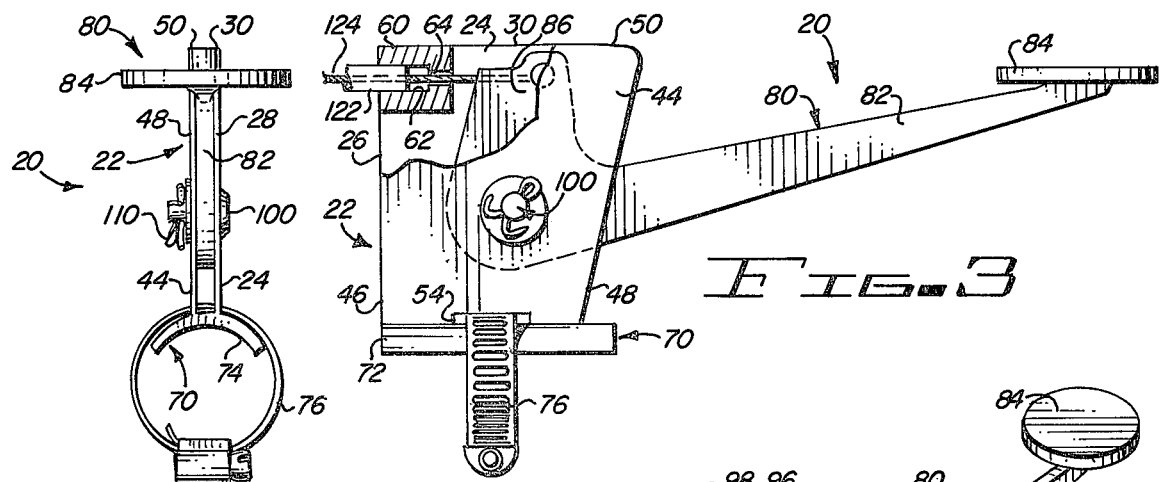
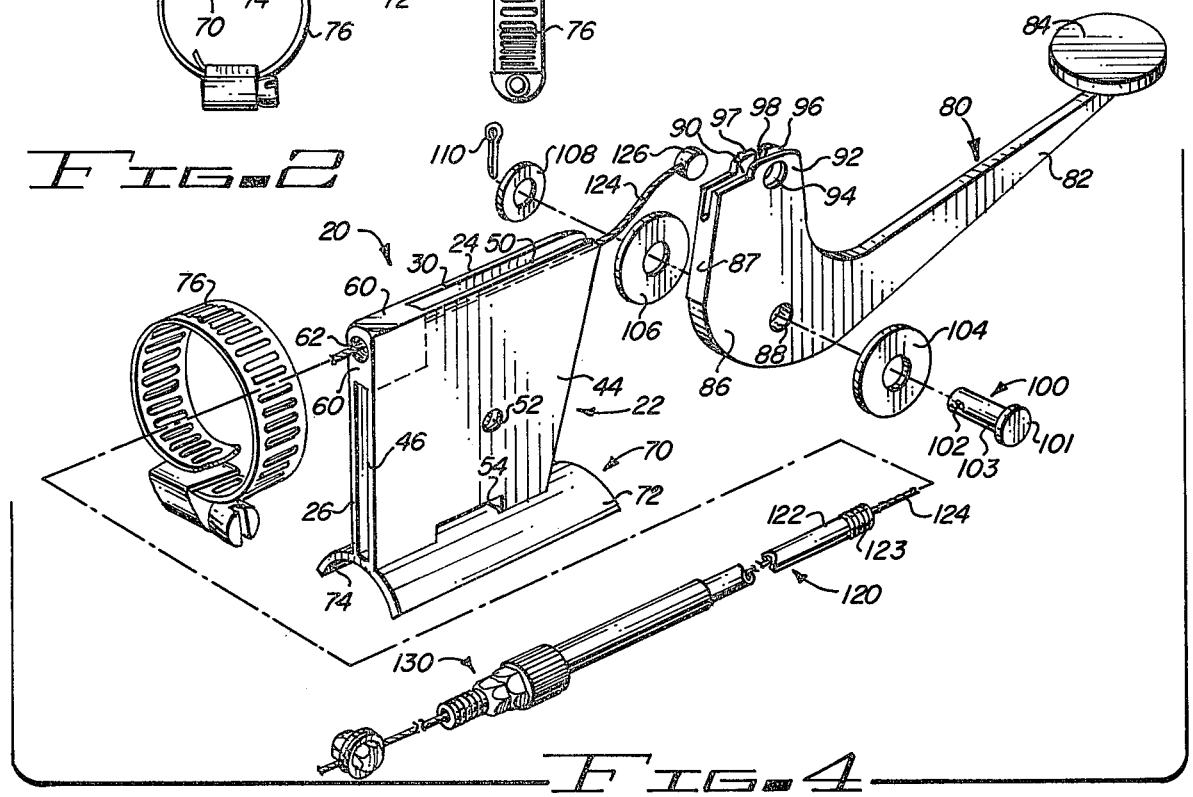

MANUALLY OPERATED THROTTLE CONTROL FOR FOUR WHEEL DRIVE VEHICLE

BACKGROUND OF THE INVENTION

1. Field of the Invention

This invention relates to a manually operated throttle control and, more particularly, to a manually operated throttle control secured to a gearshift lever to be used separately from a foot operated throttle control.

2. Description of the Prior Art

The idea or concept of a manually operated throttle control is not new. In some cases, such as disclosed in U.S. Pat. No. 1,716,814, a manually operated throttle control was connected to a foot operated throttle control or accelerator. The throttle control is secured to the gearshift lever in the '814 patent. The apparatus includes mechanical linkage through a system of levers and is actuated by lifting up a handle in a movement substantially parallel to the longitudinal axis of the gearshift rod.

Another type of manually operated throttle control is disclosed in U.S. Pat. No. 1,815,772. This apparatus is also generally a rod linkage connected to the same rod that the foot controlled throttle or accelerator pedal is connected to. The mechanical linkage is actuated by a lever which is gripped by the hand adjacent the top of the gearshift lever.

A cable operated throttle control is disclosed in U.S. Pat. No. 1,838,289. As in the previous two patents, the cable is linked to the accelerator pedal or foot operated throttle control. The apparatus in the '289 patent discloses a ratchet stop for maintaining the throttle in the appropriate, desired position. The ratchet stop presents a potential safety problem in that the apparatus may not be easily disconnected and harm may result therefrom.

Another example of cable linkage is disclosed in U.S. Pat. No. 1,959,881. As with the prior art patents, the '881 patent discloses linkage directly connected with the accelerator pedal. The cable is manually actuated through a mechanical linkage system built into a portion of the gearshift lever.

In both the '814 and '289 patents, the throttle actuation is by vertical movement along the longitudinal axis of the gearshift lever. In the '772 patent and the '881 patent the actuation of the throttle is by a pivoting action, although the '881 pivoting action is not direct, but rather is through a mechanical linkage. In all four of the patents, the mechanical linkage is connected directly to the single throttle linkage extending from the carburetor to the foot pedal of the vehicle. It will be noted that in the '881 patent, the throttle linkage must be pushed, rather than pulled, by the user. In the '772 patent, the lever must be squeezed in order to operate through a mechanical linkage system of rods and pivots.

The '289 patent includes ratchet stops which present a safety problem. Moreover, the motion of pulling axially may be difficult to accomplish, particularly with the hands involved in shifting gears. That is, in order to exert an axial pull along the longitudinal axis of the gearshift lever, the gearshift lever must be held in a particular manner. Similarly, the '814 patent requires also the grasping of the gearshift lever in a certain manner in order to exert an axial pull of the throttle control linkage. The throttle control and the gearshift lever in the '814 patent require a piston grip type hold on both the gearshift lever and the throttle control in order to operate. It would appear to be difficult to shift gears on the '814 apparatus without at the same time affecting in some manner the throttle control due to the particular design and arrangement of the apparatus.

Undoubtedly, the particular design embodied in the patents discussed above resulted from a specific need, which was probably accomplished by the particular apparatus. Another, and different, need which requires different apparatus, is satisfied by the apparatus of the present invention.

Four-wheel drive vehicles have been gaining in popularity in recent years. They allow the operators of the vehicles to have access to geographic areas not possible hitherto due to lack of roads, rough terrain, and other problems. However, one of the limitations imposed on fourwheel drive vehicles is their ability to maneuver, such as on a steep incline, or when towing a trailer, or when maneuvering on switchbacks, due to problems of controlling engine speed and operating the brake and the clutch at the same time. The obvious solution is to enable the operator to control engine speed manually while operating the brake and the clutch with both feet. Logically, the location most favorable for manual operation of engine speed (throttle control) is on the gearshift lever, since it is very likely that the gearshift may be operated at the same time the clutch and brake are required.

The normal emergency brake lever is of no, or little, value during such times due to the location of the emergency brake and its holding capacity. The emergency brake is typically actuated by hand, thus requiring the operator to release his control on either the steering wheel or the gearshift lever for actuation of the emergency brake. Moreover, the emergency brake typically is connected to only the rear wheels and applies only limited force through mechanical linkage.

In response to the problems and needs discussed above, it is desirable to provide a manually actuated throttle linkage which may, but need not, be operated in conjunction with the shifting of gears, and which is responsive to slight, convenient finger pressure but yet will not interfere with normal operation of the gearshift apparatus.

SUMMARY OF THE INVENTION

The apparatus disclosed and claimed herein comprises manually actuated throttle control apparatus secured to the gearshift lever and operable by finger control while the gearshift lever is being used. The apparatus connects directly to the throttle control at the carburetor of a vehicle rather than to the mechanical linkage extending between the foot throttle control or accelerator pedal and the throttle at the carburetor.

Among the objects of the present invention are the following:

To provide new and useful manual throttle control apparatus;

To provide new and useful apparatus for manually controlling the throttle of an automotive vehicle;

To provide new and useful apparatus for controlling the throttle of an internal combustion engine in response to finger control;

To provide new and useful apparatus for controlling the throttle of an internal combustion engine;

To provide manually operated throttle control apparatus by cable linkage secured to a pivoting member; and To provide new and useful manually operated cable linkage for controlling the throttle of an automotive vehicle.

BRIEF DESCRIPTION OF THE DRAWING

FIG. 1 is a perspective representation schematically illustrating the apparatus of the present invention in a use environment.

FIG. 2 is a vertical plan view of the throttle control apparatus of the present invention.

FIG. 3 is a side view, with a portion broken away, and in partial section, of the apparatus of FIG. 2.

FIG. 4 is a perspective exploded view of the apparatus of the present invention.

DESCRIPTION OF THE PREFERRED EMBODIMENT

FIG. 1 is a perspective view of manually actuated throttle control apparatus 20 secured to a gearshift lever 14, illustratively disposed within the driver's compartment of an automotive vehicle. The apparatus 20 is shown extending through a fire wall 18 and secured to a throttle linkage 6 of a carburetor 4 on an internal combustion engine 2. The throttle control 6 is also secured to a foot throttle control or accelerator pedal 8 by well-known mechanical linkage. The foot control or accelerator pedal 8 is disposed adjacent to a brake pedal 10 and remote from a clutch pedal 12. The appropriate mechanical linkage associated with the clutch, brake, and accelerator extend through the firewall 18 which separates the engine compartment from the driver's compartment or cab of the automotive vehicle in which the apparatus is disposed.

The transmission is disposed beneath the gearshift lever 14. Typically, the gearshift lever 14 includes a knob 16 disposed on top of the lever and grasped by the palm of the right hand of the driver of the vehicle. Both arms and both feet of the driver of a four-wheel drive vehicle are normally used when driving in rough, steep terrain. Typically, the left hand is on the steering wheel (not shown) of the vehicle, the right hand is on the knob 16 of the gearshift lever 14, the left foot operates the clutch pedal 12, and the right foot tries to operate both the foot throttle control 8 and the brake pedal 10. In order to free the right foot from having to operate two pedals substantially simultaneously, which it is almost impossible if not very difficult, awkward, and potentially hazardous to do, the manual throttle control apparatus 20 is secured to the gearshift lever 14. The actual securing of the apparatus to the gearshift lever is accomplished by means of an adapter 70, which is concave in configuration to mate with the gearshift lever 14. The gearshift lever is typically a round steel rod, and a clamp 76, which extends about the rod and holds the adapter and the entire manual throttle apparatus to the gearshift lever.

With the palm of the hand cupped about the knob 16, the index finger and middle finger may easily reach to a plate 84 at one end of a lever 80 to actuate the throttle apparatus. The lever 80 extends upwardly from a bracket 22 which is secured to the adapter 70. The lever 80 in turn is secured to a cable assembly 120. The cable assembly 120 extends from the bracket 22 to the firewall 18, and is secured to the throttle linkage 6 at the carburetor 4 within the engine compartment remote from the car or driver's compartment by a cable 124.

FIG. 2 is a vertical plan view of the throttle control apparatus 20, illustrating the various components of the apparatus. The manual throttle control apparatus includes the bracket 22, adapter 70, and lever 80.

The bracket 22 includes a pair of side plates 24 and 44, which are parallel to each other and spaced apart to receive an arm 82 of the lever 80. The side plates 24 and 44 of the bracket are secured by appropriate means, such as welding, to the adapter 70.

The side plates 24 and 44 each include a top edge 28 and 48, respectively, which extend outwardly to an outer edge 30 and 50 of each respective plate. The top and outer edges of each plate are in substantial alignment, parallel to each other. The side plates 24 and 44 also include an aperture extending through the plates, and the arm 82 of the lever 80 also includes an aperture extending through it, and the three apertures are axially aligned to receive a pin 100 which secures the lever 80, by its arm 82, to the bracket 22. The pin 100 also includes an aperture extending diametrically through one end of the shank of the pin, remote from its head, which receives a cotter key 110 to hold the pin 100 to the bracket 22.

Another pair of apertures extends through the side plates 24 and 44 adjacent the adapter 70 to receive the clamp 76. The clamp then extends above the gearshift left (see FIG. 1) to hold the apparatus together.

FIG. 3 is a side view of the throttle control apparatus 20, with a portion of the side plate 44 broken away to show the cooperating portions of the apparatus. The apparatus is shown turned on its side, rotated about ninety degrees from the view illustrated in FIG. 1.

The side plates 24 and 44 are shown substantially parallel to each other, but spaced apart to receive a portion of the lever 80, which is pivotally secured to the side plates. The side plates are in turn secured to the adapter 70 at its outer convex exterior portion 72. The clamp 76 extends through a pair of parallel, aligned apertures 54 in the side plates 22 and 44 adjacent the outer or exterior convex portion 72 of the adapter 70.

The side plate 44 includes a top edge 48, an outer edge 50, and a bottom edge 46. Similarly, the side plate 24 includes a top edge 28 (see FIG. 2) an outer edge 30, and a bottom edge 26. The bottom edges 24 and 46, and the outer edges 30 and 50, and the top edges 28 and 48, of the side plates 24 and 44 are respectively parallel to each other.

Disposed between the side plates 24 and 44 of the brackets 22, and located at the juncture of the outer edges 28 and 48 with the bottom edges 26 and 46, is a block 60. The block 60 is appropriately secured to the respective side walls. The block includes a tapped or internally threaded bore 62 extending upwardly from the lower portion of the block, which is upwardly from the bottom edges 26 and 46 of the side plates 24 and 44. The tapped or threaded bore 62 does not extend through the block 60, but rather terminates about two-thirds of the way through the block from the bottom edges of the plates. However, a bore or aperture 64 of a lesser diameter than the tapped bore 62 extends through the block from the tapped bore, and the aperture 64 is substantially coaxial with the tapped bore 62. The tapped bore 62 threadedly engages and receives the upper end of a sheath 122 of the cable assembly 120 (see also FIG. 1). Thus the sheath 122 is secured to the block 60.

A cable 124 extends through the sheath 122, and accordingly through the tapped bore 62, through the bore or aperture 64 and into the spaced between the parallel side plates 24 and 44 of the bracket 22. The upper end of the cable 124 is secured to an offset arm 86 of the lever 80. The offset arm 86 is disposed at an angle to the arm 82 of the lever. With the lever 82 pivotally secured to the bracket 22 by the pin 100, a force applied to the plate 84 of the bracket 80 will result in a corresponding movement of the offset bracket 86 as the lever 80 pivots about the pin 100, and a movement of the cable 124 will result. The cable 124 is, of course, secured to the throttle control linkage, as illustrated in FIG. 1. Therefore, movement of the plate 84 of the lever 80 will result, through the offset arm 86 and the cable 124, in movement of the throttle control linkage to control the speed of the engine of the automotive vehicle in which the apparatus is installed.

FIG. 4 is an exploded view of the manual throttle control apparatus 20 of the present invention. The bracket 22 is shown spaced apart from the lever 80 and from the cable assembly 120.

The block 60 is shown disposed at the juncture of the bottom edges and outer edges of the side plates 24 and 44 of the bracket 22. The block 60 includes a tapped portion 62 which extends upwardly from the bottom of the block, which is adjacent the bottom edges 26 and 46 of the side plates 24 and 44, respectively, to receive the upper portion of the cable sheath 122 of the cable assembly 120. The upper portion of the cable sheath 122 is shown as including a threaded portion 123, which defines the upper extremity of the cable sheath 122, and which threadedly engages the internally tapped portion 62 of the block 60. In this manner the cable assembly 120 is secured to the bracket 22. The cable 124, which extends through the sheath 122, is in turn secured to the lever 80.

The lever 80 includes the arm 82 to which is secured the plate 84. The lever 80 also includes an offset portion or lever 86 which is disposed at an acute angle with respect to the arm 82. As may be seen from FIGS. 3 and 4, the offset arm 86 is disposed at slightly less than a right angle with respect to the arm 82. At about the juncture of the two arms 82 and 84 of the lever 80 there is an aperture 88 extending through the lever. The aperture 88 mates with, and is accordingly aligned with, a pair of coaxial apertures extending through the plates 24 and 44. One of the apertures, aperture 52, is shown in FIG. 4 as extending through the plate 44. With the apertures in the side plates of the bracket 22 aligned with the aperture 88 of the lever 80, the lever and brackets are secured together by the pin 100.

The pin 100 includes a head 101 and a shank 103 secured to the head and extending outwardly therefrom. An aperture 102 extends diametrically through the distal portion of the shank 103 remote from the head 101. A pair of flat washers 104 and 106 are disposed on either side of the lever 80 and between the plates 24 and 44 to insure that the lever will pivot freely within the bracket 22. Accordingly, the shank 103 of the pin 100 extends first through the aperture 52 in the side plate 44, then through the washer 104, through the aperture 88, through the washer 106, and finally through the side plate 24. Another flat washer, washer 108, is also disposed on the shank 103 of the pin 100 on the outside of the bracket and between the side plate 24 and the cotter key 110. The cotter key or pin 110 extends through the aperture 102 which extends diametrically through the shank 103 of the pin 100. The head 101 of the pin 100 is disposed against the side plate 44 of the bracket 22. The uses of the washers 104, 106, and 108, and the pin 100 and cotter pin or key 110 are common and well known and understood in the art.

The offset arm portion 86 of the lever 80 includes a slot 90 through which extends the cable 124. The slot 90 is defined by a pair of sides 92 and 96, which comprise the distal or outer end of the offset arm portion 86 of the lever 80. At the upper end of the cable 124 is a button 126. The button is secured to the cable. The button 126 in turn extends through a pair of coaxial apertures on the sides 92 and 96 of the offset portion 86 of the lever 80. One of the coaxial apertures, aperture 94 in side 42, is shown in the Figure.

The button 126 remains in the coaxial apertures to lock the cable 124 to the lever 80 as the liner is secured to the bracket 22. A slot 98 extends downwardly from an outer edge 97 of the side 96 to the aperture (not shown) in the side 96. The purpose of the slot 98 is to receive the cable 124 to thus allow the cable 124 and the button 126 to be disposed within the slot 90 and into the mating apertures in the sides 92 and 96, the button 126 and the cable 124 are inserted with the cable 124 parallel to the slot 98, and thus perpendicular to the slot 90, and the cable 124 accordingly extends through the slot 98 and into the larger or major slot 90. When the cable 124 passes through the slot 98 into the slot 90, a portion of the button 126 will be disposed within the aperture 94, and another portion of the button 126 will be disposed within the mating aperture in the side 96. With the button thus secured to the bracket 86, the cable and button are accordingly moved downwardly to the position as generally indicated in FIG. 4, with the cable remaining in the slot 90 and aligned with the outer edges 30 and 50 of the side plates 24 and 44 of the bracket 22. The cable 124 will thus extend through the sheath 122, the block 60, and between the plates 24 and 44 of the bracket 22 to the lever 80, to which it is secured.

With the cable assembly 120 secured to the bracket 22 and the lever 80, the bracket 22 is then ready to be secured to a gearshift lever. This is accomplished by means of the clamp 76, which is illustrated as being a metallic hose clamp which includes a number of parallel perforations that mate with a screw for tightening and loosening. The clamp 76 extends through the pair of generally rectangular apertures, such as aperture 54 in the side plate 44, adjacent to the outer or convex surface 72 of the adapter 70. The inner or concave surface or portion of the adapter 70 is then disposed about the gearshift lever and the clamp 76 is fitted around the gearshift lever (see FIG. 1) and tightened to secure the manual control 20 to the automotive vehicle.

The cable sheath 122 extends from the block 60, to which it is threadedly secured, to the fire wall 18 (see FIG. 1) of the vehicle in which the apparatus is disposed. The purpose of the sheath is, as is well known and understood, to protect the cable and to provide a conduit through which the cable moves. At the distal end of the sheath 122 there is appropriate hardware 130 to secure the sheath 122 to the fire wall 18. From the fire wall, the cable continues on to the throttle control linkage 6, as indicated in FIG. 1.

The length of the lever arm 82 is substantially greater than the length of the offset arm 86 to which the cable 124 is secured. That is, the distance between the pivot point for the lever 80, which is through the aperture 88 and about the pin 100, to the plate 84, is substantially greater than the distance between the pivot point and the location to which the cable 124 is secured on the offset lever arm 86, which is through the aligned apertures, of which aperture 94 is shown in FIG. 4. Accordingly, a relatively greater movement of the plate 84 is required to obtain a lesser movement of the cable 124 and accordingly of the throttle control to which the cable 124 is secured. In this manner, the user of the manual throttle control apparatus is able to control the speed of the engine in a more precise manner than hitherto obtainable by the prior art. Moreover, the cable 124 is protected completely during the entire length of travel of the offset portion 86 of the lever 80 by being disposed between the side plates 24 and 44 of the bracket 20. The distance between the bottom edges and top edges of the side plates is sufficient to allow the offset lever portion 86 to remain disposed between the plates throughout the length of travel of the lever, from the closed throttle position, when the bottom portion 87 of the offset lever arm 86 is disposed against the upper portion of the block 60, to the wide open throttle position which is the maximum movement or length of travel for the offset arm 86.

The manual throttle control apparatus is not directly connected to the foot throttle pedal or accelerator 8 (see FIG. 1), but rather operates independently of it. The only connection between the two is at the carburetor, where both are connected to the throttle linkage.

The pivoting lever 80, with its two lever arms, gives the user precise control by moving only his fingers as he independently operates the gearshift lever and clutch. The relatively longer movement of one lever arm results in a relatively shorter movement of the other lever arm and there is a consequent very precise control of the throttle achieved.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. In an automotive vehicle having an engine compartment and driver's compartment separated by a firewall, a carburetor located in the engine compartment, and a gearshift lever in the driver's compartment, throttle control apparatus for controlling the carburetor throttle, comprising, in combination:
   bracket means secured to the gearshift lever and including
      a pair of plates spaced apart from each other,
      a block disposed between the plates, and
      bore means extending through the block;
   lever means pivotally secured to the bracket means and including
      a first arm disposed between the plates,
      a second arm extending outwardly from the first arm and outwardly of the bracket means,
      a first aperture extending through the lever means at the juncture of the first and second arms,
      fastening means extending through the first aperture for securing the lever means to the bracket means and comprising means about which the lever means pivots with respect to the bracket means;
   a cable housing extending between, and secured to, the firewall and the bore means of the bracket means;
   a cable having a first end and a second end and secured at the first end to the carburetor throttle and extending through the cable housing and secured at the second end to the first arm of the lever means for controlling the throttle in response to movement of the second arm of the lever means; and
   means for securing the cable to the first arm, including
      a first slot on the first arm for receiving the cable,
      a second aperture extending through the first arm and communicating with the slot, and
      a button secured to the cable and extending into the second aperture.

2. The apparatus of claim 1 in which the bracket means includes means for securing the pair of plates to the gearshift lever.

3. The apparatus of claim 2 in which the bore means of the bracket means includes a first bore portion for receiving the cable housing and a second bore portion coaxial with the first bore portion through which the cable extends.

4. The apparatus of claim 3 in which the first arm and the second arm of the lever means are disposed at an acute angle with respect to each other.

5. The apparatus of claim 4 in which the lever means includes a plate secured to the second arm for applying a force to pivot the lever means.

6. The apparatus for claim 5 in which the means for securing the cable to the first arm further includes a first side and a second side spaced apart from each other defining between them the first slot.

7. The apparatus of claim 6 in which the second aperture extends through the first and second sides.

8. The apparatus of claim 7 in which the means for securing the cable to the first arm further includes a second slot on the first side communicating with the second aperture for admitting the cable into the first slot.

9. The apparatus of claim 1 in which the fastening means includes a third aperture extending through the plates and a pin extending through the third aperture of the plates and through the first aperture of the lever means to secure the lever means to the bracket means and to define a pivot for the lever means.

* * * * *